US011963036B2

(12) United States Patent
Bangolae et al.

(10) Patent No.: US 11,963,036 B2
(45) Date of Patent: Apr. 16, 2024

(54) COMPUTING WORKLOAD TRANSPORT OVER CONTROL PLANE IN NEXT GENERATION CELLULAR NETWORKS

(71) Applicant: Intel Corporation, Santa Clara, CA (US)

(72) Inventors: Sangeetha L. Bangolae, Portland, OR (US); Zongrui Ding, Portland, OR (US); Youn Hyoung Heo, Sunnyvale, CA (US); Puneet Jain, Portland, OR (US); Abhijeet Ashok Kolekar, Hillsboro, OR (US); Qian Li, Beaverton, OR (US); Ching-Yu Liao, Portland, OR (US); Thomas Luetzenkirchen, Taufkirchen (DE); Sudeep K. Palat, Cheltenham (GB); Alexandre Saso Stojanovski, Paris (FR)

(73) Assignee: Intel Corporation, Santa Clara, CA (US)

( * ) Notice: Subject to any disclaimer, the term of this patent is extended or adjusted under 35 U.S.C. 154(b) by 209 days.

(21) Appl. No.: 17/405,157

(22) Filed: Aug. 18, 2021

(65) Prior Publication Data

US 2022/0038948 A1 Feb. 3, 2022

Related U.S. Application Data

(60) Provisional application No. 63/067,219, filed on Aug. 18, 2020.

(51) Int. Cl.
*H04W 28/02* (2009.01)

(52) U.S. Cl.
CPC ... *H04W 28/0289* (2013.01); *H04W 28/0215* (2013.01); *H04W 28/0273* (2013.01)

(58) Field of Classification Search
CPC ......... H04W 8/18; H04W 4/40; H04W 24/02; H04W 28/0289; H04W 28/0215; H04W 28/0273; H04W 28/086; H04W 76/11; H04W 88/085; H04W 28/0925; H04W 28/0992; H04W 8/22; H04W 8/183;
(Continued)

(56) References Cited

U.S. PATENT DOCUMENTS

2019/0149599 A1* 5/2019 Bartfai-Walcott ...... H04L 65/40
709/226
2020/0125389 A1* 4/2020 Palermo .................. G06F 9/505
(Continued)

*Primary Examiner* — Ricky Q Ngo
*Assistant Examiner* — David M Kayal
(74) *Attorney, Agent, or Firm* — Schwegman Lundberg & Woessner, P.A.

(57) ABSTRACT

An apparatus and system to enable dynamic offloading and execution of compute tasks are described. In split CU-DU RAN architectures, the CU-CP is connected with multiple compute control functions (CF) and service functions (SF) that have different computing hardware/software capabilities. Different architectures depend on whether the SF is collocated with the CU-UP, the CU-UP and SF only serve compute messages, a compute message is supplied directly to the CU-UP or also traverses the CU-CP. In response to reception from a UE of a compute message containing data for computation being sent to the CU-CP through the DU, the CU-CP sends the data to the SF with identifiers and sends the result to the UE.

19 Claims, 11 Drawing Sheets

(58) Field of Classification Search
CPC . H04W 72/25; H04W 72/0426; H04W 76/12; H04W 76/15; H04W 76/22; H04W 76/27; H04W 36/0011; G06F 2209/509; G06F 9/5072
See application file for complete search history.

(56) References Cited

U.S. PATENT DOCUMENTS

| | | | | |
|---|---|---|---|---|
| 2020/0154287 | A1* | 5/2020 | Novlan | H04L 5/0075 |
| 2020/0195521 | A1* | 6/2020 | Bogineni | H04W 48/18 |
| 2020/0351336 | A1* | 11/2020 | Campbell | H04L 67/1008 |
| 2020/0382581 | A1* | 12/2020 | Campbell | H04L 67/1021 |
| 2021/0282202 | A1* | 9/2021 | Vikberg | H04W 76/22 |
| 2022/0248383 | A1* | 8/2022 | Park | H04W 72/23 |

* cited by examiner

COMPUTING WORKLOAD TRANSPORT OVER CONTROL PLANE IN NEXT GENERATION CELLULAR NETWORKS

PRIORITY CLAIM

This application claims the benefit of priority to U.S. Provisional Patent Application Ser. No. 63/067,219, filed Aug. 18, 2020, which is incorporated herein by reference in its entirety.

TECHNICAL FIELD

Embodiments pertain to fifth generation (5G) and sixth generation (6G) wireless communications. In particular, some embodiments relate to cloud computing in such networks.

BACKGROUND

The use and complexity of wireless systems, which include $4^{th}$ generation (4G) and $5^{th}$ generation (5G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) (or new radio (NR)) systems. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
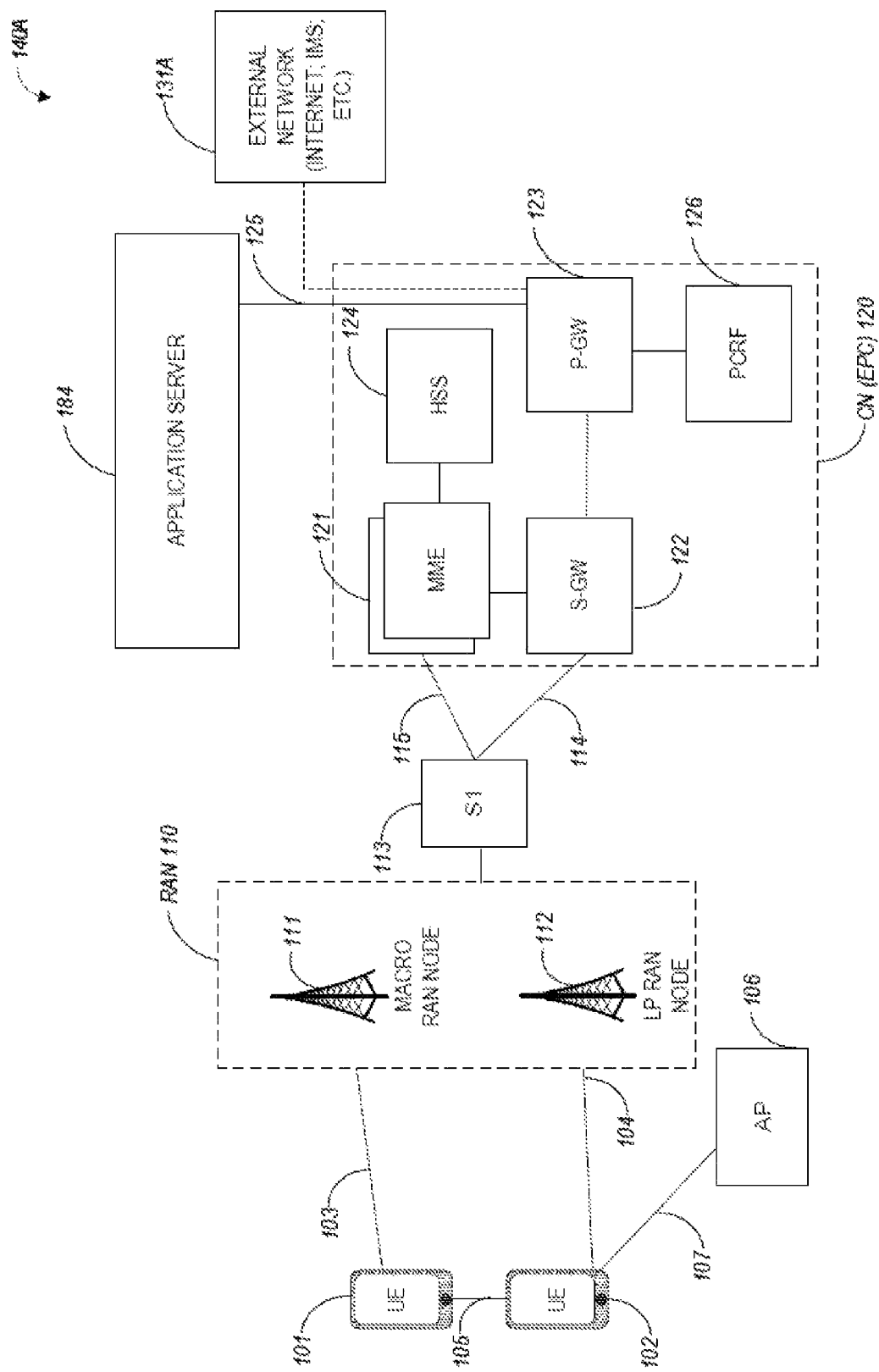
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks') but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter hank-based multi carrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via, a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may he, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1R-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMES 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which UE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G network core (5GC) 120. The NG-RAN 110 can include a plurality of nodes, such as gNBs and NG-eNBs. The core network 120 (e.g., a 5G core network/5GC) can include an access and mobility function (AMF) and/or a user plane function (UPF). The AMF and the UPF can he communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
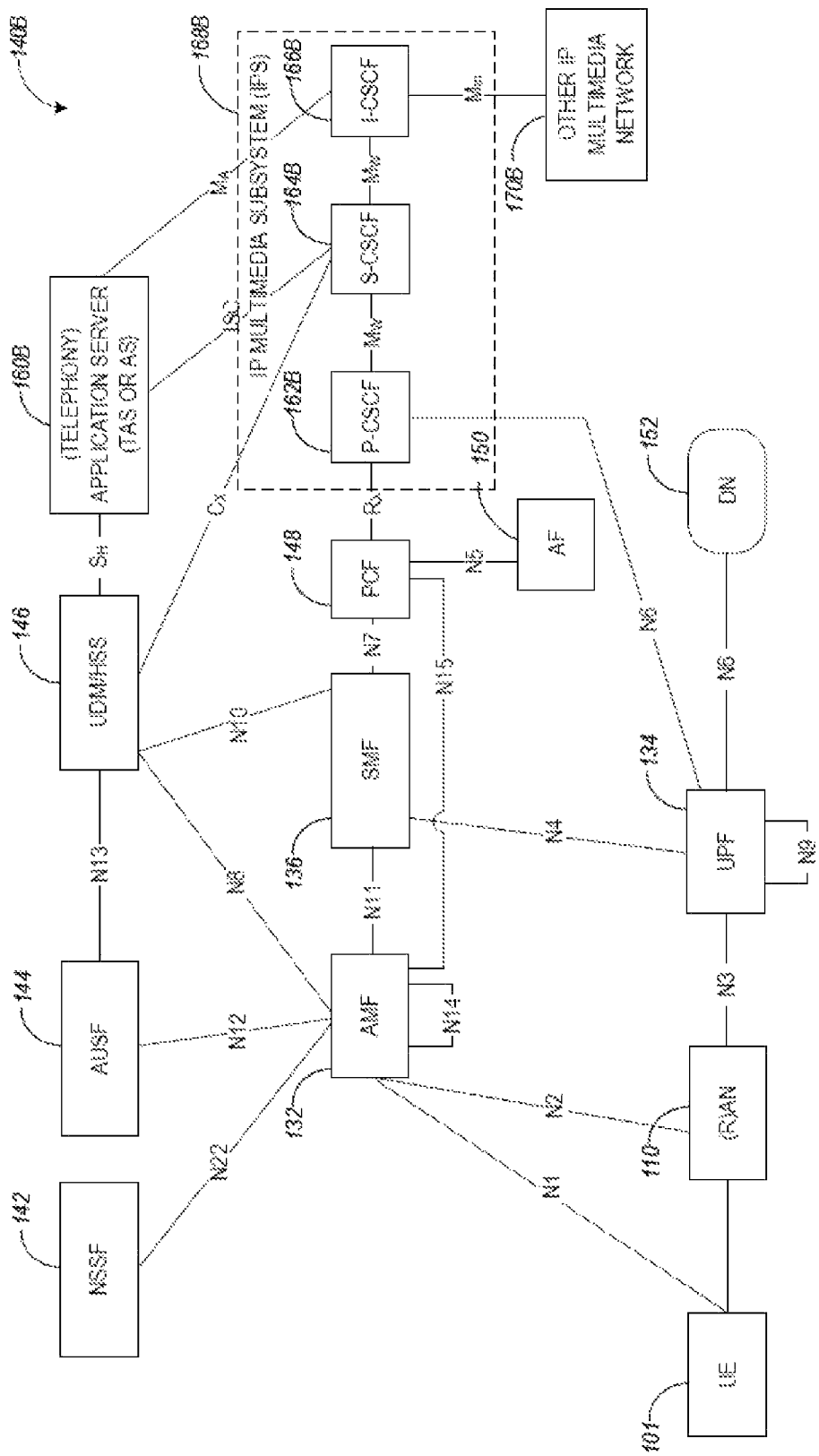
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other SGC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/FISS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
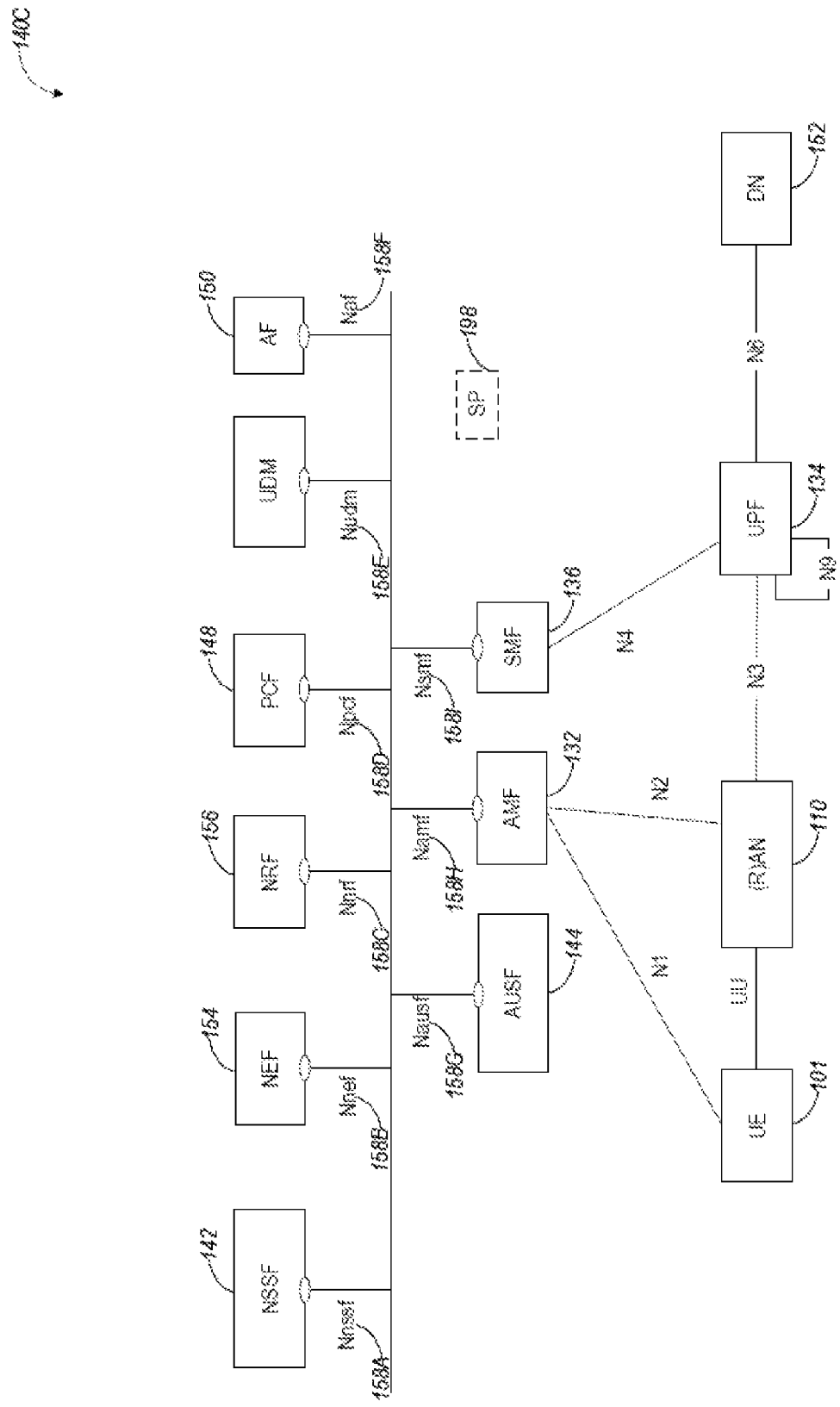
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136). Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
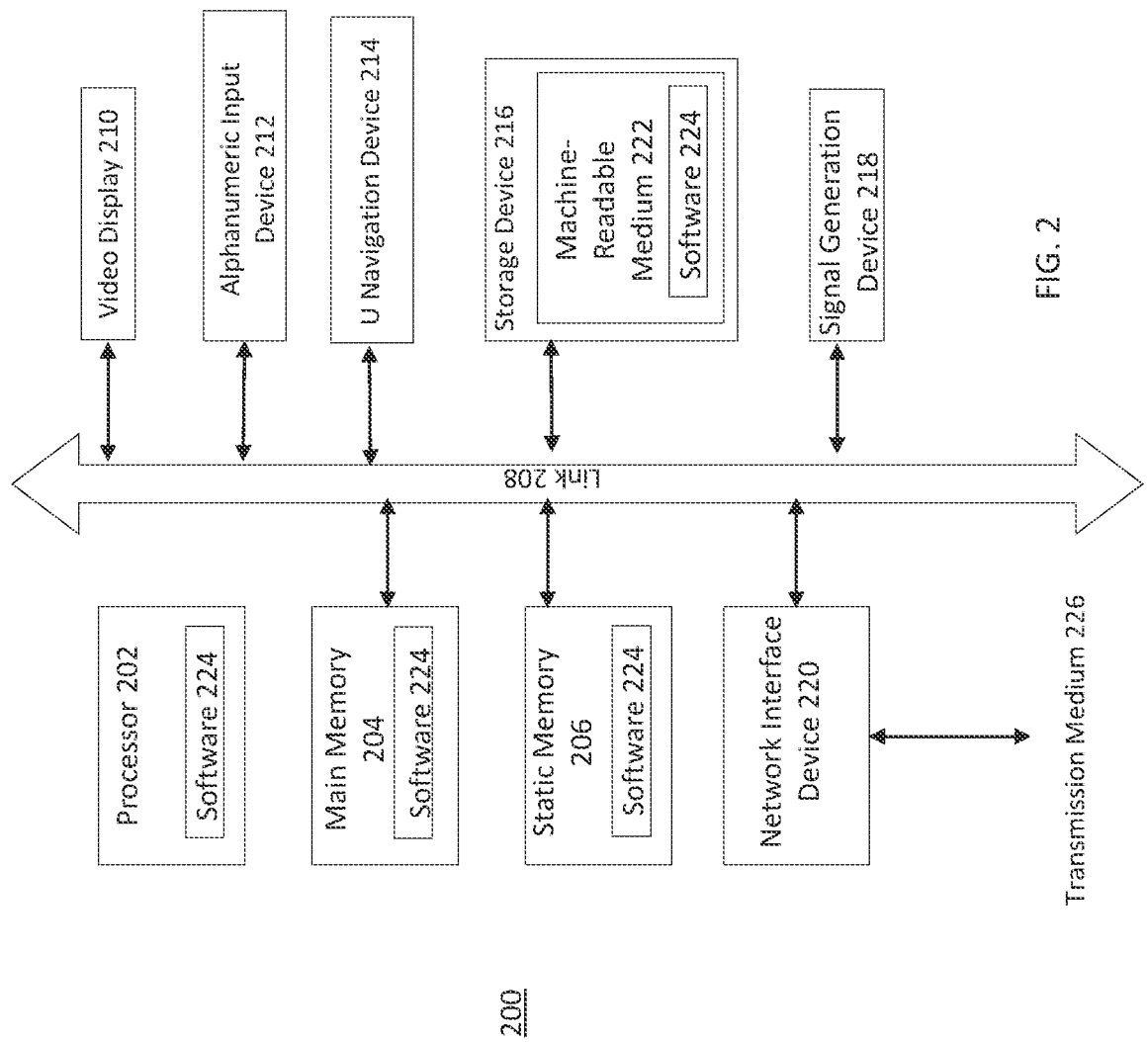
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UNITS (3G)), Wideband Code Division Multiple Access (Universal Mobile Telecommunications System) (W-CDMA (UMTS)), High Speed Packet Access (HSPA). High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10) 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR). 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC Japan in the 700MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5,47-5.65 GHz (note: allocated for example in South Korea, 5925-7125 MHz and 5925-6425MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (6172-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) Where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features in this document are defined for the network side, such as APs, eNBs, NR or gNBs—note that this term is typically used in the context of 3GPP fifth generation (5G) communication systems, etc. Still, a UE may take this role as well and act as an AP, eNB, or gNB; that is some or all features defined for network equipment may be implemented by a UE.

Modern cloud computing has become extremely popular to provide computing/storage capability to customers who can focus more on software development and data management without worrying too much about the underlying infrastructure. Edge computing may extend this capability close to the customers to optimize performance metrics such as latency. The 5G architecture design take these scenarios into considerations and developed multi-homing, Uplink Classifier (ULU) framework to offload compute tasks to different data networks (DNs), which may be at the network edge. For a UE with limited computing capabilities, the application can be rendered at the cloud/edge for computing offloading based on application level logic above the operating system (OS).

With the trend of Telco network cloudification, the cellular network is foreseen to be built with flexibility and scalability by virtualized network functions (VNFs) or containerized network functions (CNFs) running on general purpose hardware. Heterogenous computing capabilities provided by hardware and software, naturally coming with this trend, can be leveraged to provide augmented computing to end devices across device and network. These computing tasks generally have different requirements and resource and dependencies in different scenarios. For example, the computing task can be an application instance either standalone or serving one or more UEs. The computing task can also be a generic function like artificial intelligence (AI) training or inference or a micro-service function using specific accelerators. In addition, the computing task can be semi-static or dynamically launched. To enable these scenarios, augmented computing across the device and RAN are described in order to dynamically offload workload and execute compute tasks at the network computing infrastructure with low latency and better computing scaling.

To enable augmented computing as a service or network capability in 6G networks, compute control client (Comp CC) at the UE side, compute control function (Comp CF) and compute service function (Comp SF) at the network side are defined and known as "compute plane" functions to handle computing related control and user traffic. Thus, for example, small amounts of data can be offloaded (e.g., from an IoT) over the control plane for computation by the RAN.

The compute task generated at the UE/Comp CC is to be transported to the RAN Comp SF. One way of transporting this task for RAN-based computation offloading over control plane is presented and corresponding procedures and signaling details are provided. This permits the computing tasks to be completed at the network edge to optimize latency. This latency includes communication latency as well as the compute task launch and execution latency. In addition, the end device can augment computing by providing compute service requirements, e.g. the computing environment and the compute task. Moreover, the resource efficiency and latency can also be optimized using paradigms such as serverless computing to handle more dynamic workload.

Figure 3:
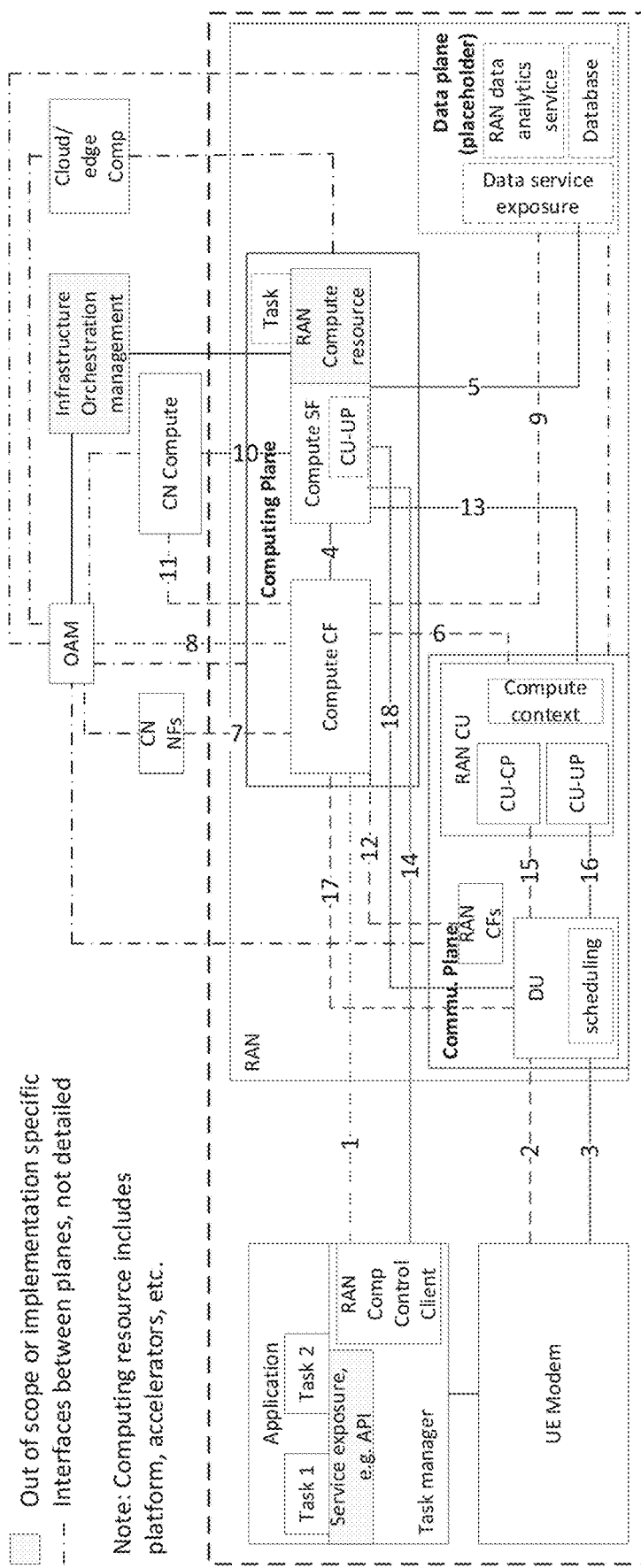
FIG. 3 illustrates an architecture to enable augmented computing in a radio access network (RAN) in accordance with some embodiments.

FIG. 3 illustrates an architecture to enable augmented computing in a RAN in accordance with some embodiments. A detailed RAN Architecture with Computing Functions is shown in FIG. 3. As shown in FIG. 3, the overall architecture of RAN is inside a black box and includes a communication plane, a computing plane, and a data plane. The functions described herein to enable network computing are RAN computing control client (Comp CC) at the UE side, the RAN computing control function (Comp CF) and the RAN computing service function (Comp SF) at the network side. The reference points in FIG. 3 are: 1) between RAN Comp client and RAN Comp CF, 2) between the UE and Comp SF, 3) between the UE and the RAN distributed unit (DU), 4) between the RAN Comp CF and SF, 5) between the RAN Comp SF and the data plane, 6) between the RAN Comp CF and the RAN centralized unit control plane (CU-CP) or user plane (CU-UP), 7) between the RAN Comp CF and CN network functions (NFs), e.g. NEF, PCF, AMF, 8) between the RAN Comp CF and the Operations, Administration and Maintenance (OAM), 9) between the RAN Comp CF and the data plane, 10) between the RAN Comp SF and the CN Comp SF, 11) between the RAN Comp CF and the CN Comp CF, 12) between the RAN Comp CF and the RAN CF, e.g., NEF, PCF, NNW, 13) between the RAN Comp SF and the RAN CU-CP or CU-UP, 14) between the RAN Comp Client and the RAN Compute SF, 15) between the RAN DU and the RAN CU-CP, 16) between the RAN DU and the RAN CU-UP, 17) between the RAN DU and the RAN Comp CF, and 18) between the RAN DU and the RAN Comp SF. Reference points 1 and 14 are logical and are be mapped to a combination of other reference points.

Figure 4:
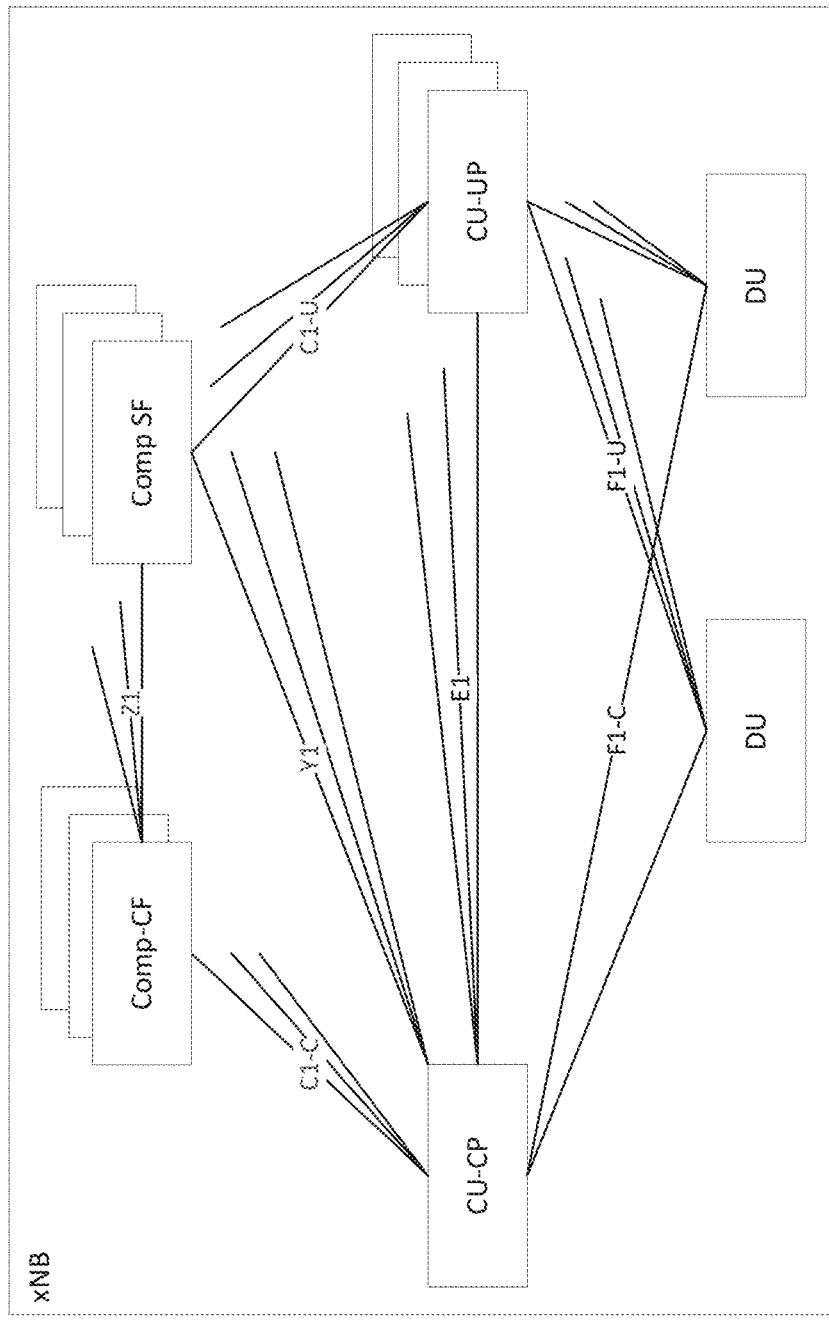
FIG. 4 illustrates a RAN architecture with a split distributed unit (DU) centralized unit (CU) and computing functions in accordance with some embodiments.

FIG. 4 illustrates a RAN architecture with a split distributed unit (DU) centralized unit (CU) and computing functions in accordance with some embodiments. As used herein, xNB refers to a base station or RAN node, such as a gNB or NG-RAN in the case of 5G architecture. As illustrated in FIG. 4, an xNB (6G NB) may consist of a CU-CP, multiple CU-LIPS, and multiple DUs on the communication plane. The CU-CP is connected to the DU through the F1-C interface, and the CU-UP is connected to the DU through the F1-U interface. One CU-UP is connected to only one CU-CP, but implementations allowing a CU-UP to connect to multiple CU-CPs, e.g., for added resiliency, are not precluded, One DU can be connected to multiple CU-UPs under the control of the same CU-CP. One CU-UP can be connected to multiple DUs under the control of the same CU-CP. The basic functions of the E1 interface include an E1 interface management function and an E1 bearer context management function.

On the computing plane, the xNB contains multiple Comp CFs and multiple Comp SFs with the following principles: One CU-CP can be connected to multiple Comp CFs, e.g., for different network slices, and multiple Comp SFs, e.g., for different computing hardware/software capabilities through interface C1-C and Y1 respectively. One Comp CF can be connected to multiple Comp SFs through interface Z1 and one CU-UP can be connected to multiple Comp SFs through interface C1-U.

All of the discussions herein apply to different architectures of the xNB. This correspondingly depends on the split architecture assumed for future cellular generation RAN nodes.

Transport for Compute Task

As part of the dynamic distribution of compute intensive workload between the UE and the network, the following aspects are considered: transport protocol design for offloading compute intensive workload over a control plane procedure, including collocated and non-collocated scenario considerations for the compute service function (whether collocated with the CU-UP or the xNB); and support of IP and Non-IP based radio interface protocol design with the help of protocol stacks between the UE and the Network and compute specific radio bearers.

Figure 5:
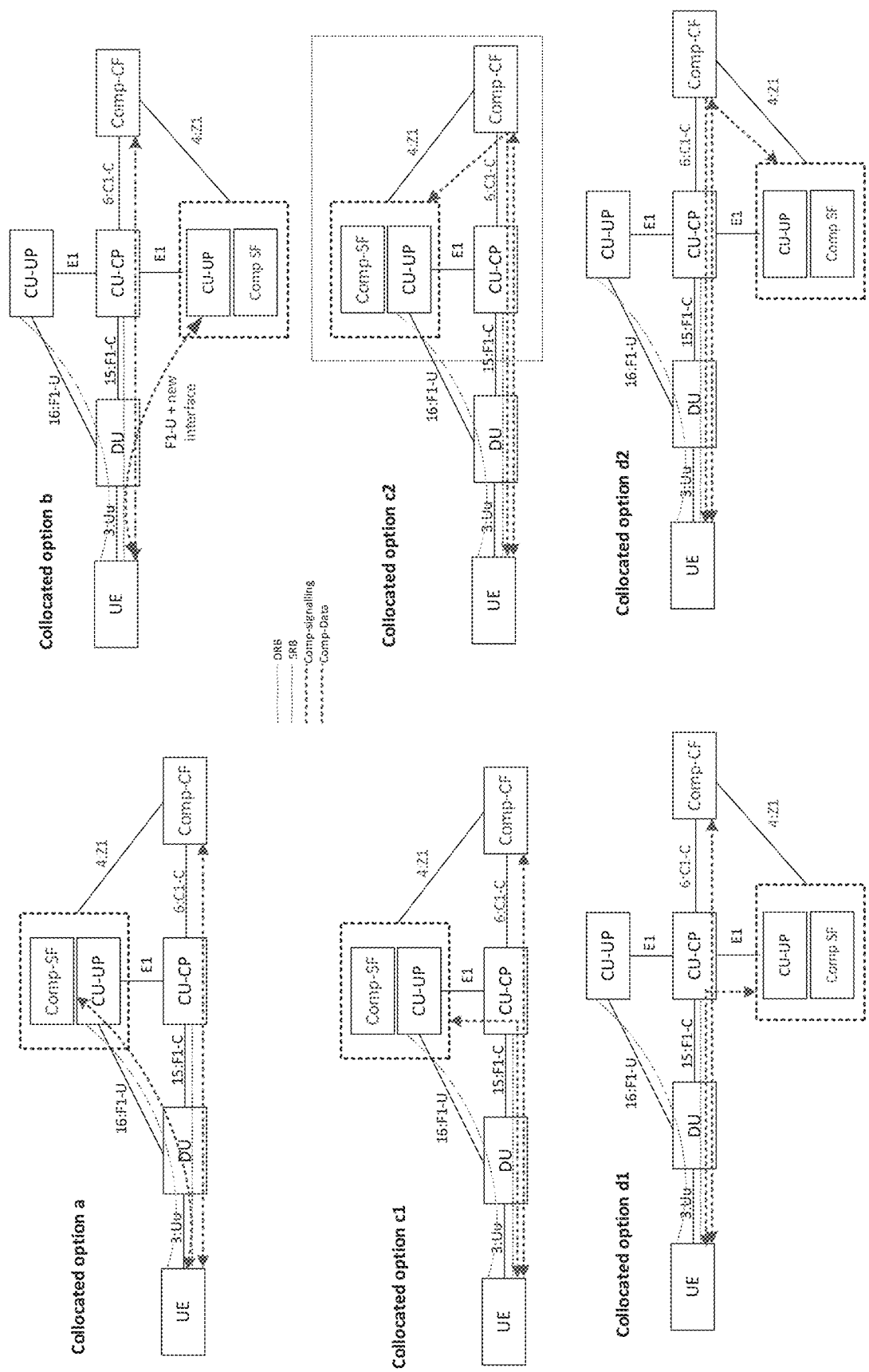
FIG. 5 illustrates scenarios for RAN compute message transport (collocated case) in accordance with some embodiments.
Figure 6:
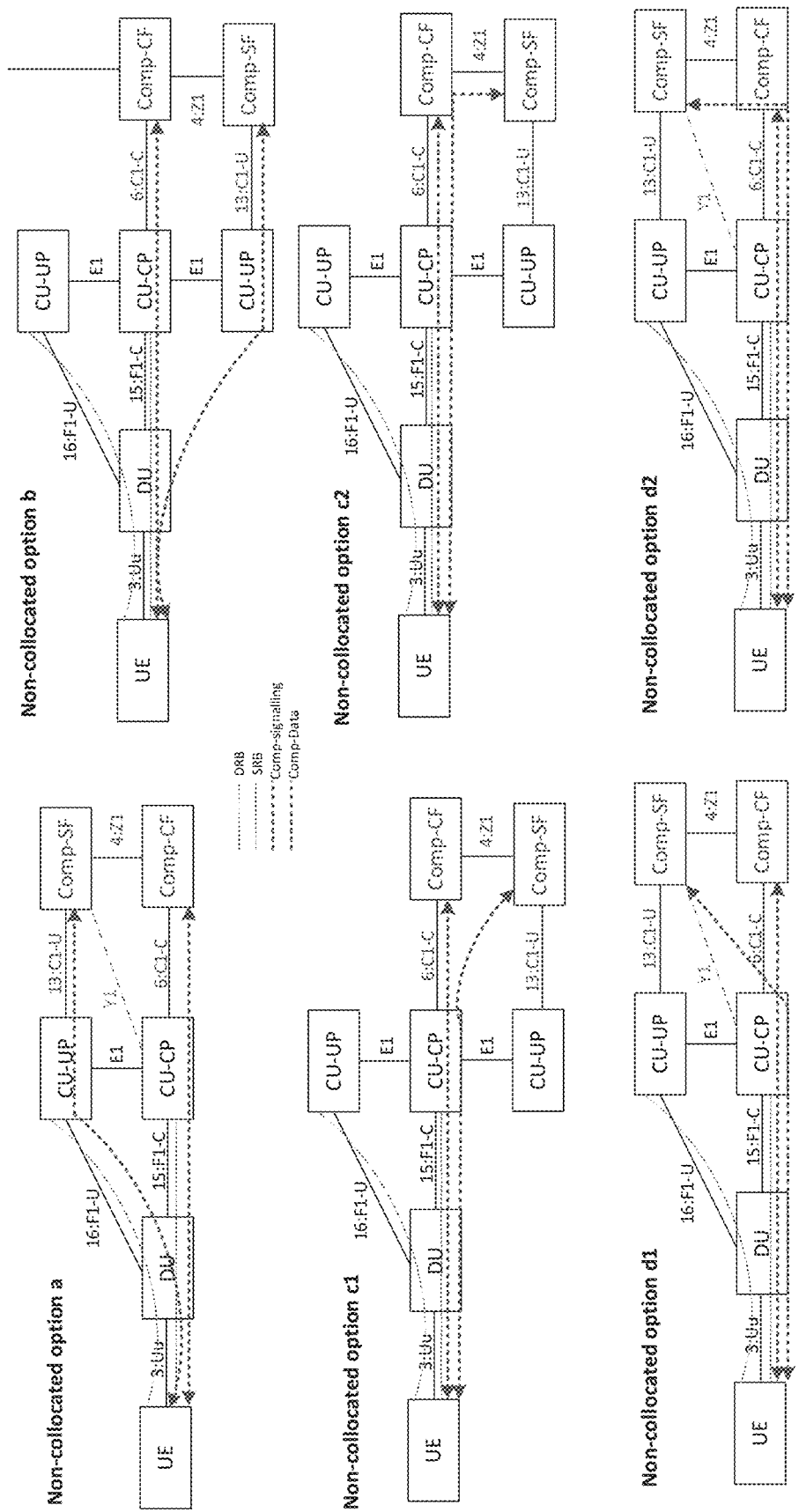
FIG. 6 illustrates scenarios for RAN compute message transport (non-collocated case) in accordance with some embodiments.

FIG. 5 illustrates scenarios for RAN compute message transport (collocated case) in accordance with some embodiments. FIG. 6 illustrates scenarios for RAN compute message transport (non-collocated case) in accordance with some embodiments. The scenarios for collocated and non-collocated shown in FIGS. 5 and 6 include: whether the RAN Comp SF is collocated with CU-UP or not (all options); whether the CU-UP+RAN Comp SF serve only compute messages (other normal Signaling Radio Bearers (SRBs) and Data Radio Bearers (DRBs) are served by another instance of CU-UP) (all except option a, c1 and c2); whether the compute message goes via CU-CP or not [as referred to by options c1, c2, d1 and d2 in FIGS. 5 and 6] as opposed to CU-UP in other options; the interfaces between the different entities, some new (e.g., Y1) and some old that are to support new features/functions (e.g. E1, F1); and a RAN compute session establishment procedure is assumed to be utilized for establishing a RAN compute session between the UE and the RAN network.

Embodiment 1) using pre-established RAN Compute session with data sent over control plane (both IP and non-IP)

Figure 7:
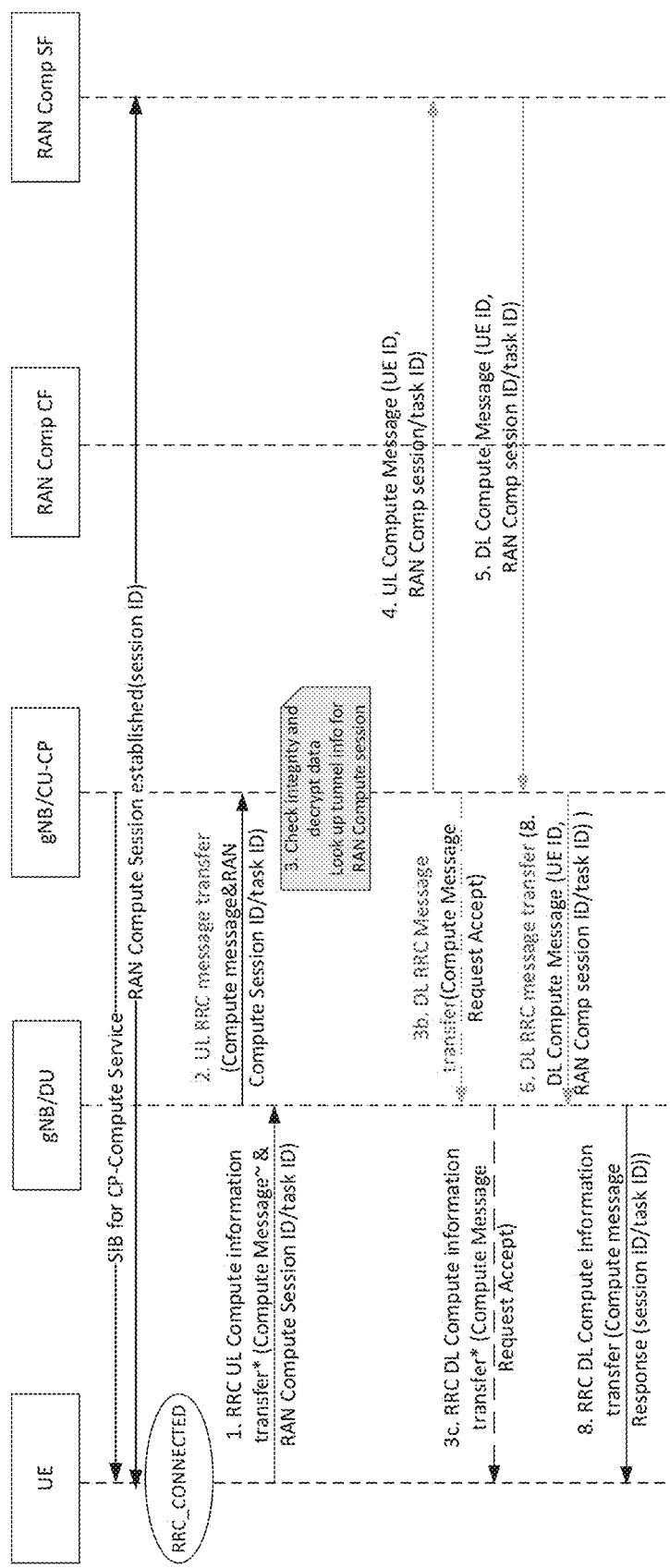
FIG. 7 illustrates a procedure for UE to send computation message using compute over control plane option in accordance with some embodiments.

FIG. 7 illustrates a procedure for UE to send computation message using compute over control plane option in accordance with some embodiments. In FIG. 7, the computation task is sent over RAN control plane using a pre-established RAN Compute session. As shown, a UE in RRC_CONNECTED mode can perform computation message transmission using control plane messages. The control plane signaling refers to the RRC messages between the UE and the CU-CP that can be carried using the existing SRB or newly defined SRB or the newly defined Compute radio bearer for control messages [referred to as CRB-C] or CRB-S for signaling. Between the CU-CP and the RAN Comp CE, the C1 interface is defined to carry these control messages.

As shown in FIG. 7, at operation 1, a UE in RRC_CONNECTED mode sends a compute message embedded within the RRC signaling message along with the RAN Compute session ID and/or task ID (depending on how the compute task is defined). The RRC signaling can be a new or existing RRC message defined in the 3GPP specification.

At operation 2, the compute message (as an RLC bearer of new or existing computation-specific signaling radio bearer) is sent from the DU to the xNB-CU-CP using existing RRC message transfer. No context transfer is necessary as the UE is already in the RRC_CONNECTED mode and has current configuration.

At operation 3, the CU-CP performs an integrity check and decrypts data and prepares to send the data to the RAN Comp SF. It is assumed that the RAN Comp CF was already selected during RAN Compute session establishment. If necessary, optionally, the CU-CP may choose another RAN Comp CF, however, then, the UE context is transferred accordingly. At operation 3b, the CU-CP responds to the DU to provide a message accept after a successful integrity check and decryption of data. At operation 3c, the DU forwards the compute message accept to the UE so that the UE can be sure that the computation can be offloaded. Operations 3b and 3c are optional.

At operation 4, the CU-CP forwards the compute message along with the UE ID and session ID/task ID corresponding to the service with specific QoS, to the RAN Comp SF using the tunnel ID information. Optionally, if a direct interface does not exist between the two, the CU-CP may forward the Compute message to the computation control plane i.e., the RAN Comp CF, which then forwards the message to the RAN Comp SF.

At operation 5, the RAN Comp SF provides a Compute message response in reverse, in the DL direction towards the CU-CP.

At operation 6, the CU-CP forwards the Compute message response to the DU.

At operation 7, the DU forwards the Compute message response to the UE along with the session ID/task ID.

Figure 8:
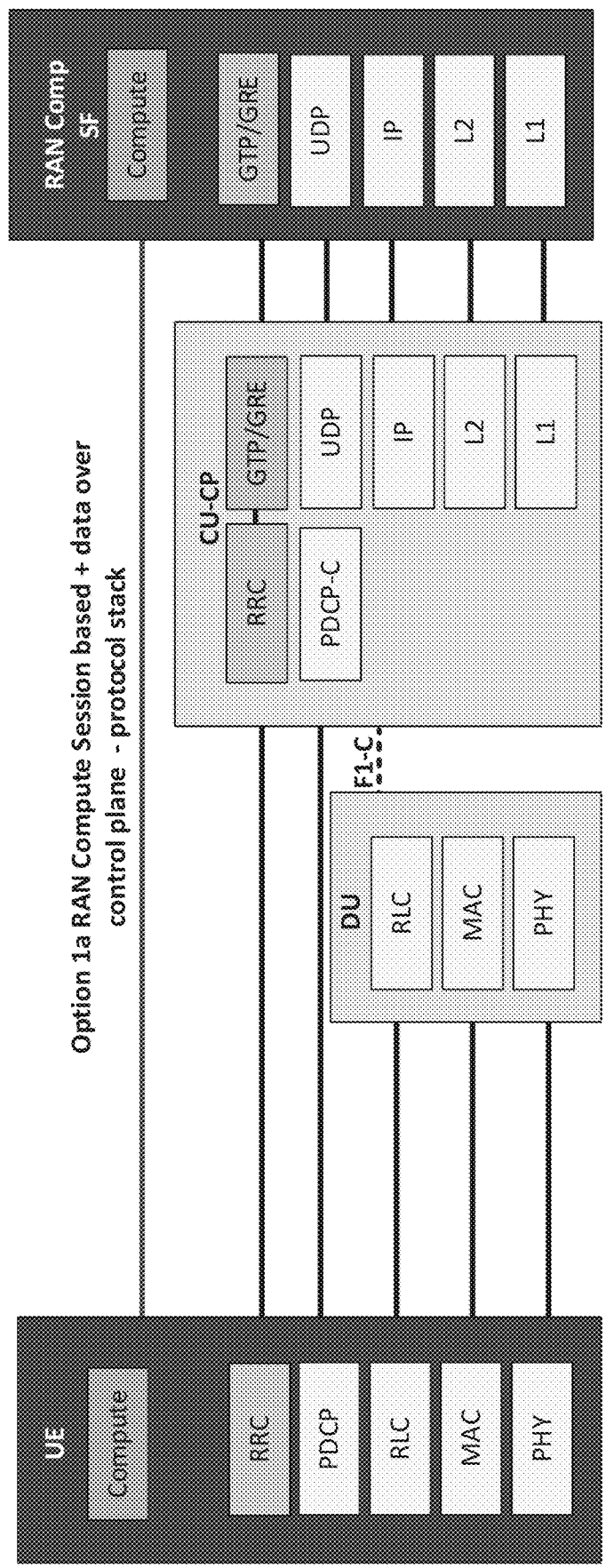
FIG. 8 illustrates a user plane (UP) protocol stack for sending a compute message over the control plane (CP) in accordance with some embodiments.

Embodiment 2) Protocol Stack for Sending Compute Data/Messages Over Control Plane FIG. 8 illustrates a UP protocol stack for sending a compute message over the CP in accordance with some embodiments. In FIG. 8, the CU-CP directly interfaces to the RAN Comp SF. The CU-CP is assumed to have a direct interface towards the RAN Comp SF. This uses a new interface, Y1, to he defined between the two entities for the non-collocated scenarios. It is shown in option 'd1,' of the scenarios in FIG. 6 and there is a direct data path between the two entities over this interface in non-collocated case. When the CU-UP and Comp SF are collocated, then, the E1 interface is updated to support the data path. This is shown in FIG. 5 (option 'd1').

Figure 9:
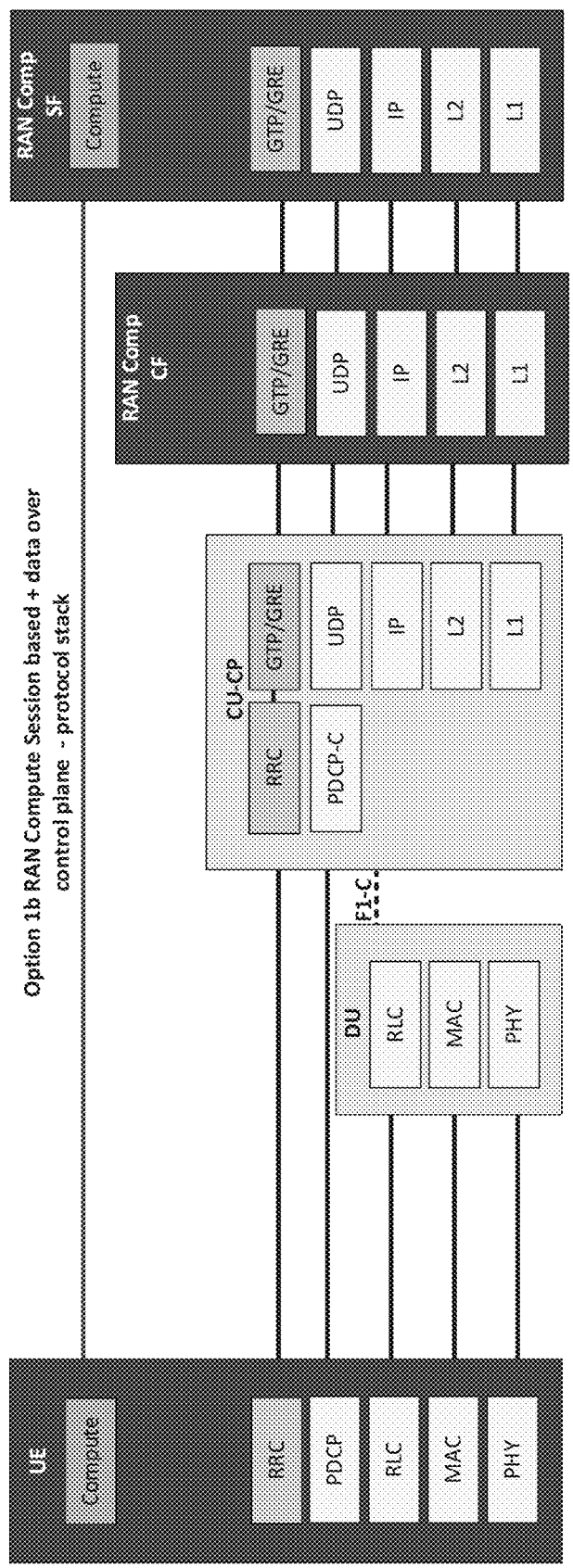
FIG. 9 illustrates another UP protocol stack for sending a compute message over the CP in accordance with some embodiments.

FIG. 9 illustrates another UP protocol stack for sending a compute message over the CP in accordance with some embodiments. It is also possible to have the data go through the RAN Comp CF and then transported to the RAN Comp SF as shown in FIG. 9. The control plane protocol stack is similar as the data itself goes over the control plane. Although GTP/GRE tunneling between the entities is assumed, it is exemplary, and any other protocol may also apply. The link between the end-to-end 'compute' entities refer to the RAN compute session that is pre-established using a RAN compute session establishment procedure.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more," In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a radio access network (RAN) centralized unit (CU) control plane (CU-CP) of a RAN, the apparatus comprising:
processing circuitry configured to:
decode, from a user equipment (UE), a radio resource control (RRC) message containing a compute message, the compute message comprising an indication of a compute task to be offloaded to the RAN and data of the compute task;
in response to reception of the compute message, determine a CU user plane (CU-UP) and RAN computing service function (Comp SF) associated with the CU-UP for computation of the compute task dependent on computing capabilities of the RAN Comp SF;
encode the data for transmission to the RAN Comp SF;
decode results of the compute task from the RAN Comp SF; and
encode, for transmission to the UE, another RRC message containing a compute message response that provides the results of the compute task; and
a memory configured to store information of the compute task.

2. The apparatus of claim 1, wherein the compute task is sent over a RAN control plane using a pre-established RAN compute session.

3. The apparatus of claim 1, wherein the processing circuitry is further configured to:
encode, for transmission to the UE, a system information broadcast (SIB) message that contains information of a compute service for communication of the compute task, and
establish a RAN compute session between the UE and RAN Comp SF for the compute service.

4. The apparatus of claim 3, wherein the RRC message between the UE and the CU-CP is carried using a signaling radio bearer (SRB), control plane signaling provided to a RAN computing control function (RAN Comp CF) from the CU-CP via a RAN Comp CF C1 interface.

5. The apparatus of claim 3, wherein:
the UE is in an RRC_CONNECTED mode,
the compute message comprises at least one of a RAN compute session identifier (ID) or a task ID of the RAN compute session, and
the processing circuitry is further configured to:
decode the compute message from a distributed unit (DU) using a further RRC message,
perform an integrity check on the compute message,
decrypt the data, and
prepare to send the data to the RAN Comp SF.

6. The apparatus of claim 5, wherein the processing circuitry is further configured to at least one of:
select a RAN computing control function (Comp CF) during establishment of the RAN compute session, or
in response to reception of the compute message, select another RAN Comp CF and transfer a UE context to the other RAN Comp CF.

7. The apparatus of claim 5, wherein the processing circuitry is further configured to encode, for transmission to the DU in response to a successful integrity check and decryption of the data, a compute message accept for transmission to the UE in response to the compute message.

8. The apparatus of claim 5, wherein the processing circuitry is further configured to one of:
encode, for transmission to the RAN Comp SF using tunnel ID information, a container if a direct interface is present between the CU-CP and the RAN Comp SF, the container comprising the compute message, a UE ID, and the one of the session ID or task ID, and
encode, for transmission to a RAN computing control function (Comp CF) to forward to the RAN Comp SF, the container if a direct interface does not exist between the CU-CP and the RAN Comp SF.

9. The apparatus of claim 1, wherein:
the RAN Comp SF is collocated with the CU-UP, and
the CU-UP and RAN Comp SF are limited to serving compute messages such that other Signaling Radio Bearers (SRBs) and Data Radio Bearers (DRBs) are served by other CU-UP instances.

10. The apparatus of claim 1, wherein:
the RAN Comp SF is collocated with the CU-UP, and
the CU-UP serves Signaling Radio Bearers (SRBs) and Data Radio Bearers (DRBs) in addition to compute messages.

11. The apparatus of claim 1, wherein the data is supplied to the CU-UP and RAN Comp SF through the CU-CP.

12. The apparatus of claim 1, wherein:
the RAN Comp SF is non-collocated with the CU-UP, and
the CU-UP and RAN Comp SF are limited to serving compute messages such that other Signaling Radio Bearers (SRBs) and Data Radio Bearers (DRBs) are served by other CU-UP instances.

13. The apparatus of claim 1, wherein the processing circuitry is further configured to:
encode, for transmission to the RAN Comp SF collocated with the CU-UP, a first container over an E1 interface, the first container comprising the compute message, a UE identifier ID, and the one of a session ID or task ID, and
encode, for transmission to the RAN Comp SF non-collocated with the CU-UP, a second container over a Y1 interface, the second container comprising the compute message, a UE ID, and the one of the session ID or task ID.

14. An apparatus for a user equipment (UE), the apparatus comprising:
processing circuitry configured to:
determine that a compute task is to be offloaded to a radio access network (RAN) for computation by a RAN computing service function (Comp SF);
encode, for transmission to a RAN centralized unit (CU) control plane (CU-CP), a compute message to indicate the compute task to be offloaded and data of the compute task, the compute message comprising at least one of a RAN compute session identifier (ID) or task ID; and
decode, from the RAN, a compute message response that provides results of the compute task performed by the RAN Comp SF; and
a memory configured to store information of the compute task.

15. The apparatus of claim 14, wherein the processing circuitry is further configured to:
decode, from the RAN CU-CP, a system information broadcast (SIB) message that contains information of a compute service for communication of the compute task, and
establish a RAN compute session between the UE and RAN Comp SF for the compute service.

16. The apparatus of claim 14, wherein:
the RAN Comp SF is collocated with the RAN CU-UP, and
the CU-UP serves Signaling Radio Bearers (SRBs) and Data Radio Bearers (DRBs) in addition to compute messages.

17. The apparatus of claim 14, wherein:
the RAN Comp SF is non-collocated with the RAN CU-UP, and
the CU-UP and RAN Comp SF are limited to serving compute messages such that other Signaling Radio Bearers (SRBs) and Data Radio Bearers (DRBs) are served by other CU-UP instances.

18. A non-transitory computer-readable storage medium that stores instructions for execution by one or more processors of a radio access network (RAN) centralized unit (CU) control plane (CU-CP) of a RAN, the one or more processors to configure the RAN CU-CP to, when the instructions are executed:
decode, from a user equipment (UE), a compute message, the compute message comprising an indication of a compute task to be offloaded to the RAN and data of the compute task;
in response to reception of the compute message, determine a CU user plane (CU-UP) and RAN computing service function (RAN Comp SF) associated with the CU-UP for computation of the compute task:
encode, for transmission to the RAN Comp SF, the data via an interface that is dependent on whether the RAN Comp SF is collocated with the RAN CU-UP;
decode, from the RAN Comp SF, results of the compute task; and
encode, for transmission to the UE, a compute message response that provides the results of the compute task.

19. The medium of claim 18, wherein the one or more processors further configure the RAN CU-CP to, when the instructions are executed:
encode, for transmission to the UE, a system information broadcast (SIB) message that contains information of a compute service for communication of the compute task, and
establish a RAN compute session between the UE and RAN Comp SF for the compute service.

* * * * *